(12) United States Patent
Lannen et al.

(10) Patent No.: US 9,233,590 B1
(45) Date of Patent: Jan. 12, 2016

(54) CONTROL OF ADJUSTABLE RIDE HEIGHT SUSPENSION

(71) Applicant: GM GLOBAL TECHNOLOGY OPERATIONS LLC, Detroit, MI (US)

(72) Inventors: Richard J. Lannen, Royal Oak, MI (US); Robert E. Zeweke, Shelby Township, MI (US); Andrew R. Krenz, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/317,028

(22) Filed: Jun. 27, 2014

(51) Int. Cl.
*B60G 17/00* (2006.01)
*B60W 10/00* (2006.01)
*B60W 10/22* (2006.01)
*B60G 17/016* (2006.01)
*B60G 17/015* (2006.01)

(52) U.S. Cl.
CPC .......... *B60G 17/016* (2013.01); *B60G 17/0155* (2013.01)

(58) Field of Classification Search
USPC ................. 701/37–38; 280/5.5, 5.501–5.507
See application file for complete search history.

(56) References Cited

U.S. PATENT DOCUMENTS

2003/0125859 A1* 7/2003 Dix et al. .................. 701/50
2014/0367930 A1* 12/2014 Zeweke et al. ............ 280/5.514

* cited by examiner

*Primary Examiner* — Yonel Beaulieu
(74) *Attorney, Agent, or Firm* — Quinn Law Group, PLLC

(57) ABSTRACT

A method is disclosed for controlling a suspension corner connected to a road wheel in a vehicle's adjustable suspension system. The method includes monitoring operation of the vehicle, detecting an occurrence of a predetermined vehicle event, and detecting a road speed of the vehicle. The method also includes monitoring a ride height of the vehicle at the suspension corner. The vehicle ride height at the suspension corner is selected via a bladder arranged at the suspension corner. The bladder is characterized by a variable height and configured to pump a fluid in response to forces generated at the road wheel and hold a volume of the fluid. The method additionally includes selecting the ride height at the suspension corner in response to the detected occurrence of the predetermined vehicle event and the detected vehicle road speed by regulating the volume of the fluid being held by the bladder.

20 Claims, 6 Drawing Sheets

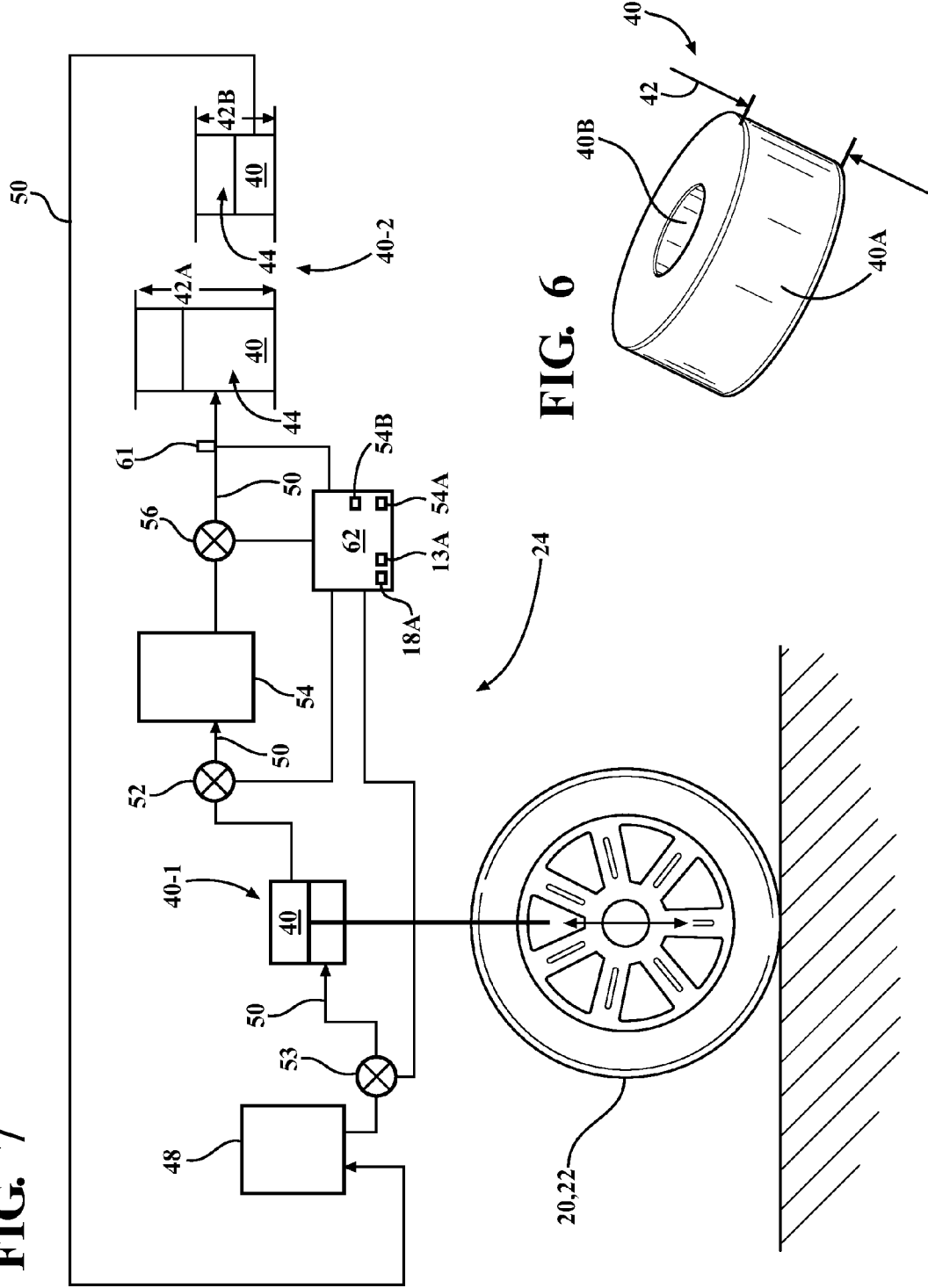

CONTROL OF ADJUSTABLE RIDE HEIGHT SUSPENSION

TECHNICAL FIELD

The present disclosure relates to a system and a method for controlling an adjustable ride height suspension in a vehicle.

BACKGROUND

Contemporary on- and off-road going vehicles typically employ suspension systems that generally include a system of springs, shock absorbers, and linkages that connect a vehicle body to the vehicle's wheels. Because the majority of forces acting on the vehicle body are transmitted through contact patches between the road and the tires, one of the main objectives of a vehicle suspension is to maintain the contact between the vehicle's road wheels and the road surface. Additionally, the design of the suspension also influences the height of the vehicle body relative to the road surface, i.e., the vehicle's ride height.

Vehicle suspension systems generally contribute to the vehicle's road-holding/handling and braking, as well as provide comfort and reasonable isolation from road noise, bumps, and vibrations to the vehicle occupants. Because these objectives are generally at odds, the tuning of suspensions involves finding a compromise that is appropriate to each vehicle's intended purpose. For example, a suspension for a sporting vehicle may be tuned to give up some ride comfort in return for enhanced operator control, while a suspension for a luxury vehicle may be tuned for the opposite outcome.

SUMMARY

A method is disclosed for controlling a suspension corner of an adjustable suspension system in a vehicle having a vehicle body and a road wheel. The suspension corner connects the road wheel to the vehicle body and maintains contact between the road wheel and a road surface. The method includes monitoring operation of the vehicle, detecting an occurrence of at least one predetermined vehicle event, and detecting a road speed of the vehicle. The method also includes monitoring a height of the vehicle body relative to the road surface, i.e., vehicle ride height, at the suspension corner. The vehicle ride height at the suspension corner is selected via a bladder arranged at the suspension corner. The bladder is characterized by a variable height and configured to pump a fluid in response to forces generated at the road wheel and hold at least a volume of the fluid. The method additionally includes selecting the vehicle ride height at the suspension corner in response to the detected occurrence of the at least one predetermined vehicle event and the detected road speed of the vehicle by regulating the volume of the fluid being held by the bladder.

The vehicle may include an electrical system having a controller, wherein the electrical system is in operative communication with the adjustable suspension system. In such a case, each of the steps of monitoring operation of the vehicle, detecting the occurrence of the at least one predetermined vehicle event, detecting the road speed of the vehicle, monitoring the height of the vehicle body, and selecting the height of the vehicle body may be accomplished via the controller.

The step of detecting the occurrence of the at least one predetermined vehicle event may include detecting initiation of operation of the electrical system.

The vehicle may include a user-interface-based manual switch in operative communication with the controller and configured to request the height of the vehicle body relative to the road surface at the suspension corner. In such a case, the step of detecting the occurrence of the at least one predetermined vehicle event may include detecting via the controller the height of the vehicle body relative to the road surface at the suspension corner requested via the user-interface-based manual switch.

The step of selecting the height of the vehicle body relative to the road surface at the suspension corner in response to the detected road speed of the vehicle may be accomplished automatically via the controller.

The adjustable suspension system may include an accumulator configured to selectively retain the fluid pumped by the bladder and release the fluid to the bladder above an accumulator pressure threshold value. In such a case, the accumulator pressure threshold value may be programmed into the controller, and the step of detecting the occurrence of the at least one predetermined vehicle event may include detecting the accumulator threshold pressure value via the controller.

The vehicle may include a powertrain having a transmission. In such a case, the step of detecting the occurrence of the at least one predetermined vehicle event may include detecting via the controller an operating mode of the transmission, such as either a park or a specific drive range selected in the transmission.

The adjustable suspension system may include a valve in fluid communication with the accumulator, wherein such a valve is configured to selectively retain the accumulated fluid in and release the accumulated fluid from the accumulator. The adjustable suspension system may also include a sensor configured to detect the volume of the fluid held by the bladder and generate a signal indicative of the volume to the controller. In such a case, the step of selecting the height of the vehicle body may be accomplished via the controller regulating the valve in response to the signal.

The suspension corner may include a control arm connecting the road wheel to the vehicle body. The suspension corner may also include a damper arranged between the control arm and the vehicle body and configured to cushion forces being generated at the road wheel as the vehicle traverses the road surface. In such a case, the forces generated at the road wheel may displace the control arm and in turn actuate the bladder to pump the fluid.

The bladder may have a general ring shape defining a hollow middle section. Additionally, the damper may include a fastening member that extends through the middle section.

The bladder may include a first bladder and a second bladder. In such a case, the first bladder may be arranged between the damper and the body and the second bladder may be arranged between the damper and the control arm.

Also disclosed is a vehicle having an electrical system that includes the controller and is in operative communication with the adjustable suspension system, wherein the controller is configured to perform the above method.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 6 is a schematic perspective view of the bladder.

FIG. 7 is a schematic illustration of the hydraulic circuit configured to control the adjustable suspension system.

DETAILED DESCRIPTION

Figure 1:
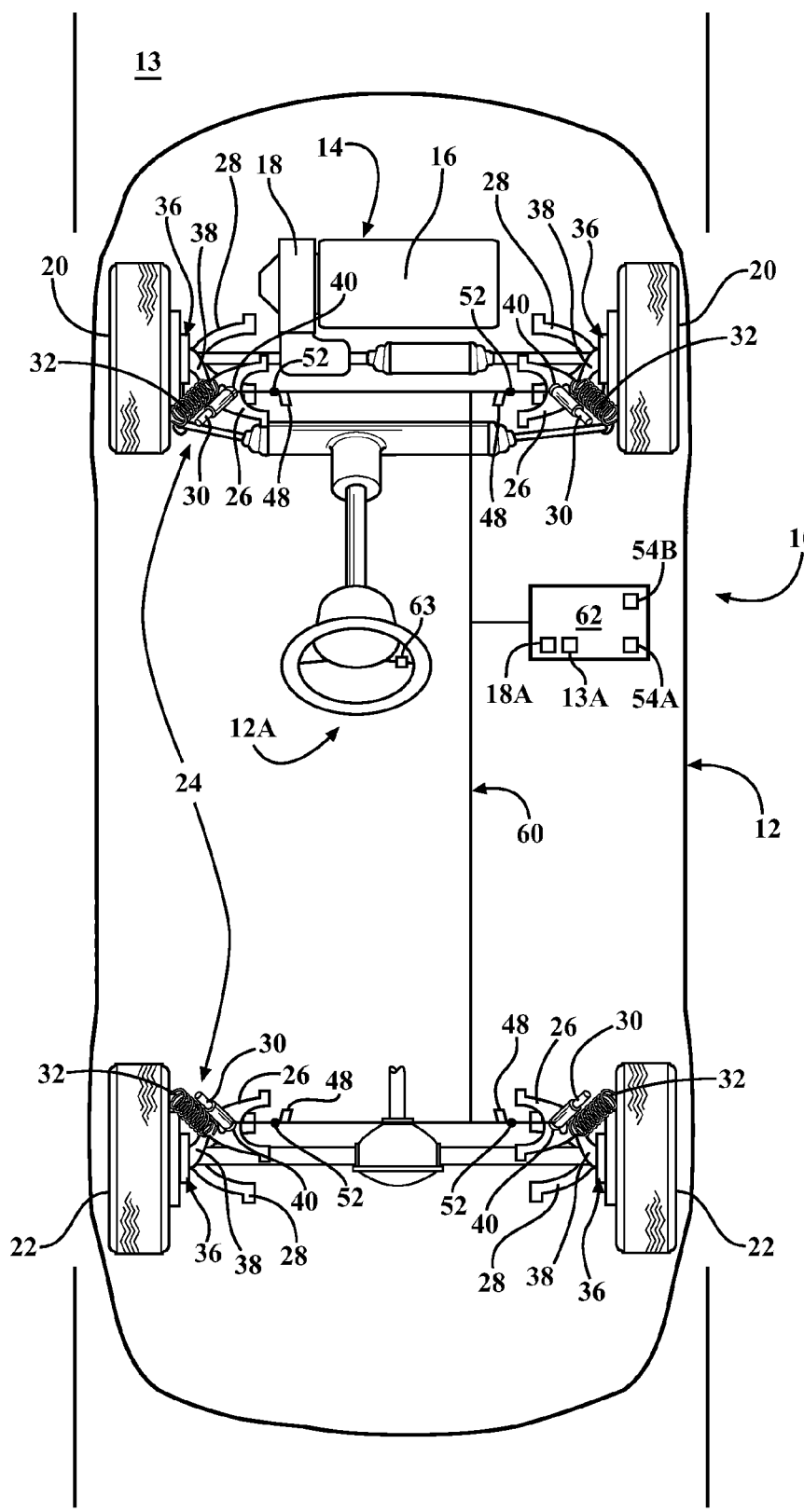
FIG. 1 is a plan view of a motor vehicle having an adjustable suspension system according to the disclosure.

Referring to the drawings, wherein like reference numbers refer to like components, FIG. 1 shows a schematic view of a motor vehicle 10, which includes a vehicle body 12 and a passenger compartment 12A. The vehicle 10 also includes a powertrain 14 configured to propel the vehicle. As shown in FIG. 1, the powertrain 14 includes an engine 16 and a transmission 18. The powertrain 14 may also include one or more motor/generators and a fuel cell, neither of which are shown, but a powertrain configuration employing such devices would be appreciated by those skilled in the art.

The vehicle 10 also includes a plurality of road wheels that include front wheels 20 and rear wheels 22. Although four wheels, i.e., a pair of front wheels 20 and a pair of rear wheels 22, are shown in FIG. 1, a vehicle with fewer or greater number of wheels is also envisioned. As shown, an adjustable vehicle suspension system 24 operatively connects the body 12 to the front and rear wheels 20, 22 for maintaining contact between the wheels and a road surface 13, and for maintaining handling of the vehicle. The suspension system 24 may include an upper control arm 26, a lower control arm 28, a shock absorber or damper 30, and a spring 32 connected to each of the front and rear wheels 20, 22. Although a specific configuration of the suspension system 24 is shown in FIGS. 1-3, other vehicle suspension designs are similarly envisioned, such as using a strut 34, as represented by an individual suspension corner 36 shown in FIGS. 4-5).

The suspension system 24 also includes a plurality of knuckles 38, each configured to support a respective road wheel 20, 22 via a wheel hub and bearing assembly (not shown). FIGS. 2-3 depict the representative corner 36 of the suspension system 24, which includes a representative knuckle 38. Each knuckle 38 may be operatively connected to the body 12 via the upper control arm 26 and the lower control arm 28, and have its motion in response to road input controlled by the combination of a shock absorber, a.k.a., damper 30 and spring 32, or the strut 34. The damper 30 or strut 34 is configured to cushion or dampen forces being generated at the wheel 20, 22 as the vehicle 10 traverses the road surface 13.

Figure 2:
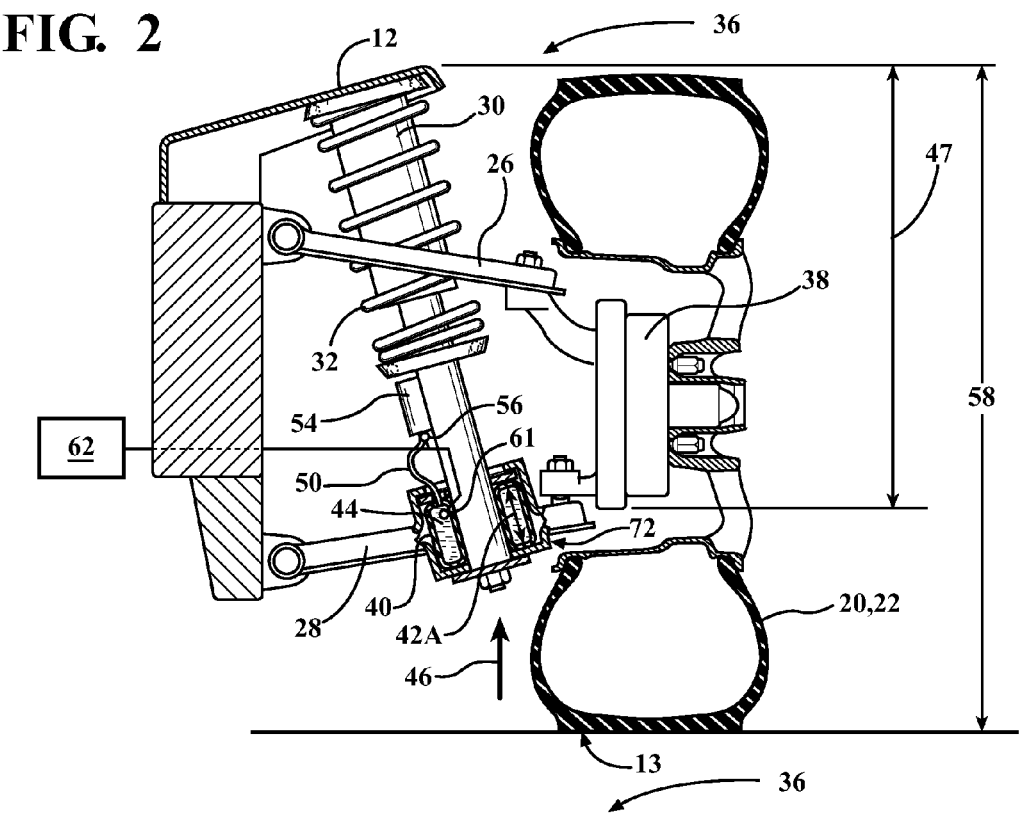
FIG. 2 is a schematic cross-sectional illustration of one type of a suspension corner of the vehicle shown in FIG. 1 having a spring, a damper, a control arm, and an inflatable bladder in an inflated state, wherein the bladder is disposed between the damper and the control arm.
Figure 3:
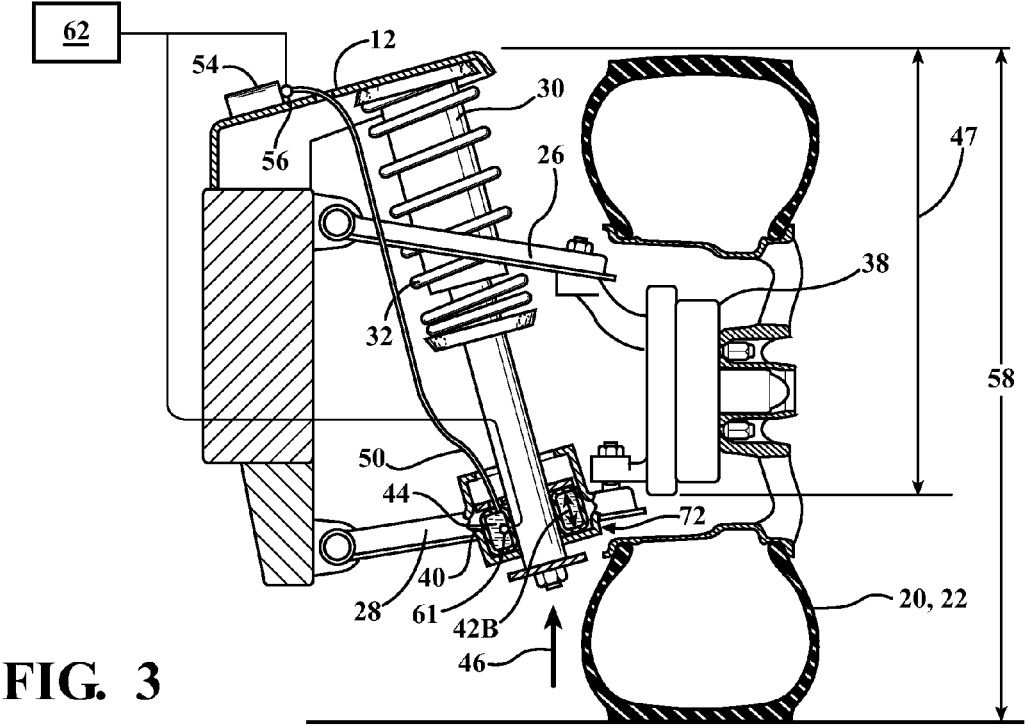
FIG. 3 is a schematic illustration of the suspension corner shown in FIG. 2, wherein the bladder is shown in a deflated state.
Figure 4:
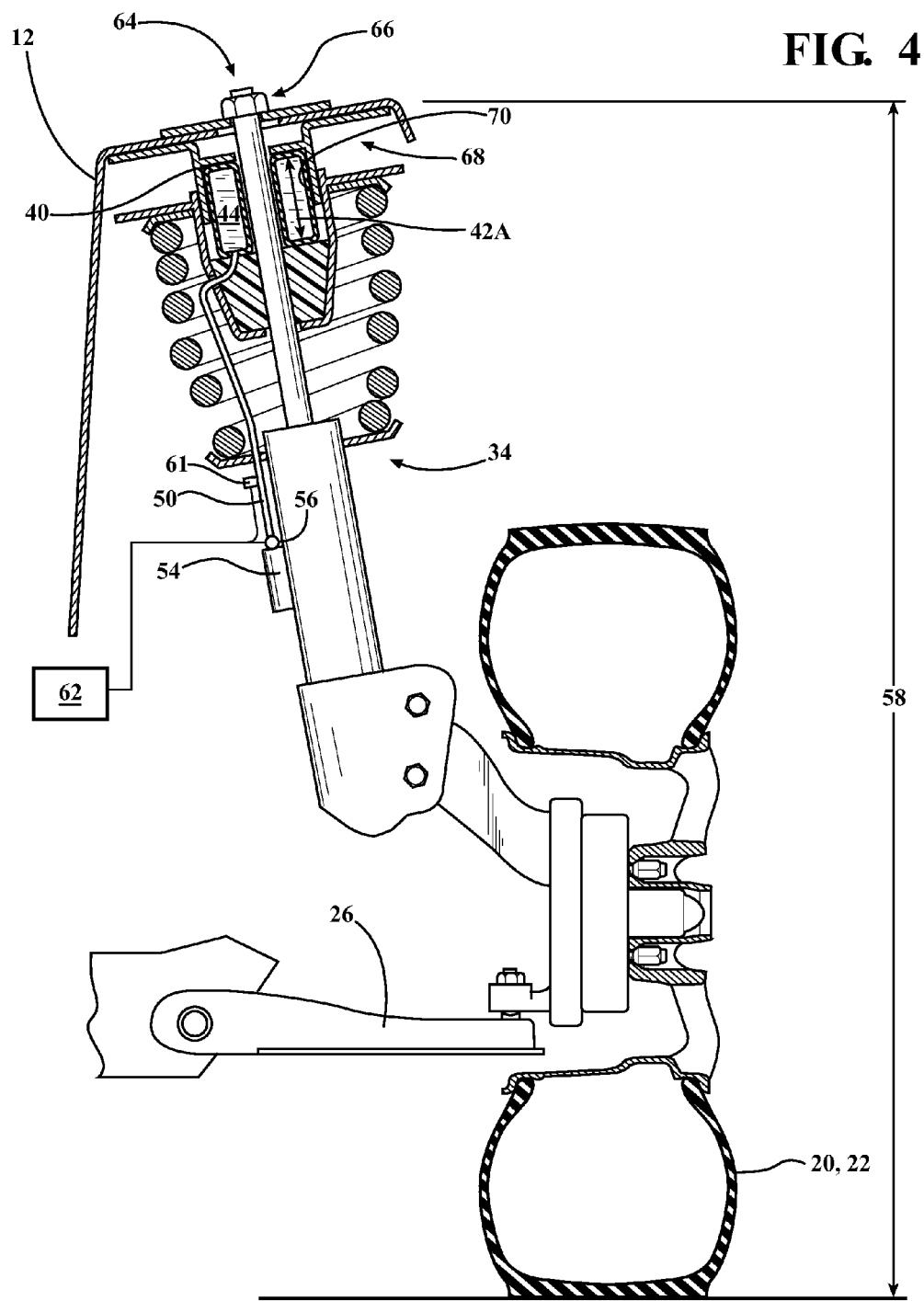
FIG. 4 is a schematic cross-sectional illustration of another type of suspension corner shown in FIG. 1 having a strut, a control arm, and an inflatable bladder in an inflated state, wherein the bladder is disposed between the strut and the vehicle body.
Figure 5:
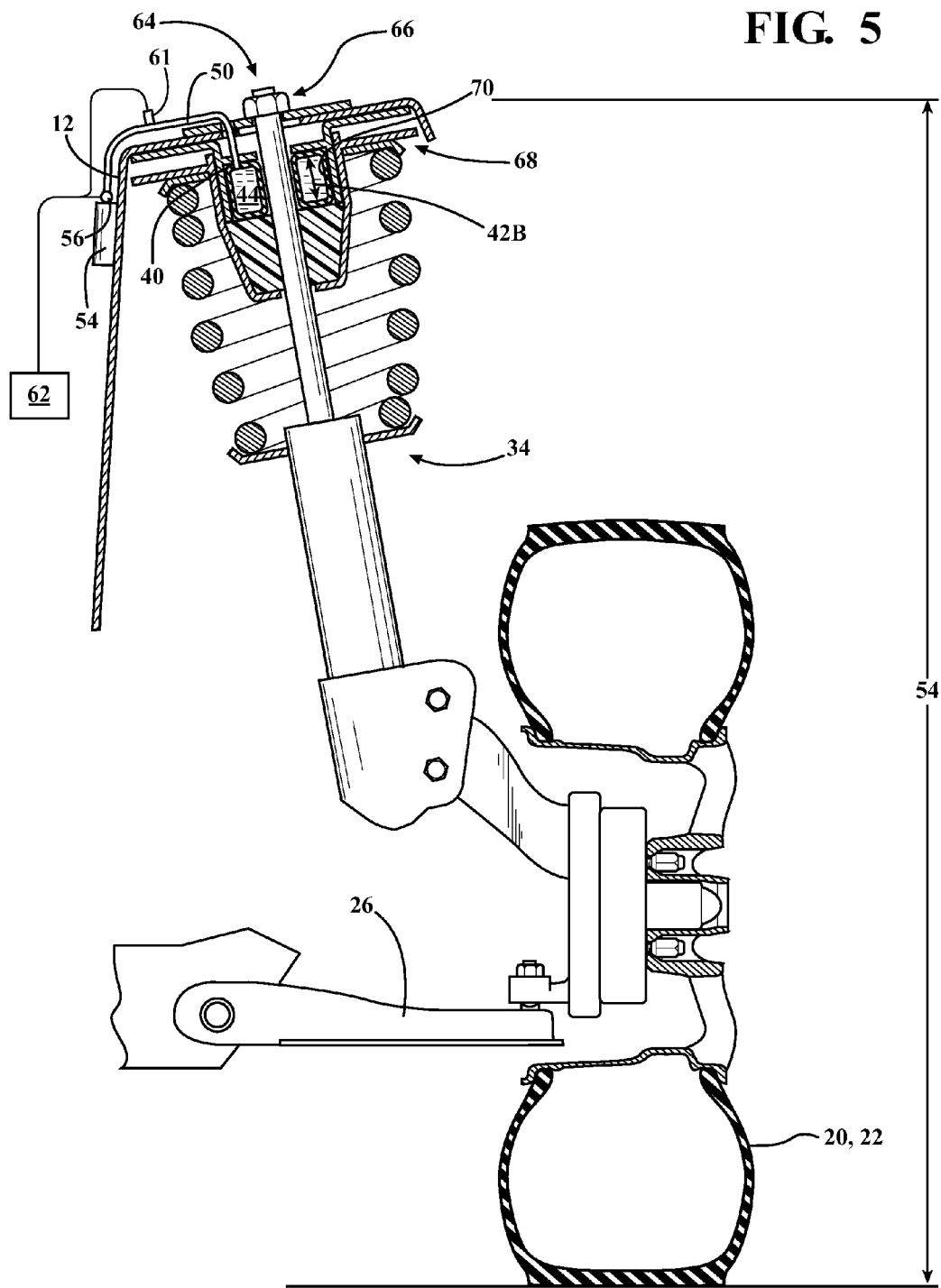
FIG. 5 is a schematic cross-sectional illustration of the suspension corner shown in FIG. 4, wherein the bladder is shown in a deflated state.

As shown in FIGS. 2-6, the suspension system 24 also includes a bladder 40 arranged at each suspension corner 36. The bladder 40 constitutes a container that is fillable by a fluid and configured to selectively expand in volume as additional fluid 44 is retained therein and contract as the fluid is removed therefrom. The bladder 40 is characterized by a variable height 42 (shown in FIG. 6), i.e., one that changes according to the amount of fluid 44 retained by the bladder, wherein inflated height 42A is shown in FIGS. 2 and 4, and deflated height 42B is shown in FIGS. 3 and 5. The bladder 40 is positioned in line with the damper 30 or strut 34. The bladder 40 is configured to pump a fluid 44 in response to forces and displacement 46 generated at the wheel 20, 22 as the vehicle 10 traverses the road surface 13 and the wheel moves vertically with respect to the road surface. At any time during operation of the vehicle 10, the bladder 40 generally holds a volume of the fluid 44. The volume of the fluid retained by the bladder 40 establishes an effective distance 47 between the lower control arm 28 and the vehicle body 12.

As shown in FIG. 7, the suspension system 24 additionally includes a reservoir 48 in fluid communication with the bladder 40 via a system of fluid tubes 50. The reservoir 48 is configured to collect the fluid 44 circulating through the fluid tubes 50 and subsequently on demand release the fluid into the bladder 40. In FIG. 7, the bladder 40 operating in a pump mode is identified with a numeral 40-1, while the bladder 40 operating in a fluid retention mode is identified with a numeral 40-2. As shown, the bladder 40 is in fluid communication with the reservoir 48 via a fluid tube 50. A first on-off valve 52 may be positioned between the bladder 40 and the accumulator 54 to selectively maintain the bladder in the pump mode 40-1. A second on-off valve 53 may be positioned between the reservoir 48 and the bladder 40 to selectively release the fluid 44 from the reservoir to the bladder and facilitate circulation of the fluid through the bladder operating in the pump mode 40-1. Each of the first and second on-off valves 52, 53 may be regulated by a controller that will be described in detail below.

In the pump mode 40-1, the bladder 40 pressurizes the fluid 44 received from the reservoir 48 and delivers the pressurized fluid to an accumulator 54. The accumulator 54 is controlled by a valve 56 to selectively accumulate or retain the pressurized fluid 44 and when prompted to release the fluid to the bladder 40 operating in the fluid retention mode 40-2. The valve 56 may be a one-way pressure valve that may be regulated by a controller that will be described in greater detail below. Accordingly, the height 42 of the bladder 40 is varied in response to the volume of the fluid 44 being supplied thereto from the accumulator 54 via the valve 56. Furthermore, as the bladder 40 selectively inflates and deflates with the fluid 44, the changing height 42 of each bladder sets a height of the vehicle body 12, i.e., ride height 58, relative to the road surface 13 at each suspension corner 36. The height 42 of the bladder 40 may be varied by the valve 56 in discrete intervals or height steps, or varied substantially infinitely as deemed necessary.

As shown in FIG. 1, the vehicle 10 includes an electrical system 60. The electrical system 60 can be in a standby mode while the vehicle is not in use, and its operation can be initiated, for example, when the vehicle 10 is unlocked or is otherwise switched on by an operator. The suspension system 24 may also include a sensor 61 (shown in FIGS. 4-5 and 7) that is positioned at each suspension corner 36 and operatively connected to the electrical system 60. As shown, each sensor 61 can be positioned at the respective bladder 40 (shown in FIGS. 2-3) or at an appropriate fluid tube 50, between the accumulator 54 and the subject bladder (shown in FIGS. 4-5), and configured to detect the volume of the fluid 44 held by the respective bladder, for example by sensing fluid pressure. The sensor 61 may also generate a signal indicative of the volume of the fluid 44 held by the bladder 40. The vehicle also includes a controller 62 that is part of the electrical system 60 and is operatively connected to the sensor 61.

The controller 62 includes a memory that is tangible and non-transitory. The memory may be any recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 62 may also include a floppy disk, a flexible disk, hard disk, magnetic tape, any other magnetic medium, a CD-ROM, DVD, any other optical medium, etc. The controller 62 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 62 or accessible thereby may be stored in the memory and automatically executed to provide the required functionality.

The controller 62 is in operative communication with the adjustable suspension system 24. The controller 62 is additionally configured to receive the signal from the sensor 61 via any appropriate means, such as via a hard-wired electrical connection or a wireless connection using a specified radio frequency, for monitoring and closed-loop control of the ride height 58. As such, the controller 62 may regulate each of the first and second on-off valves 52, 53 to support the pump mode 40-1 operation of the bladder 40 (shown in FIG. 7). Additionally, the controller 62 regulates the valve 56 in response to the signal to selectively accumulate and release the fluid 44 retained by the accumulator 54 in order to select the ride height 58 and support the bladder 40 during its operation in the fluid retention mode 40-2 (also shown in FIG. 7).

The controller 62 may be a standalone control unit dedicated to regulating the valve 56 in order to vary and select the ride height 58 in response to road conditions, road speed of the vehicle 10, and other pre-set variables, as well as an occurrence of specific predetermined vehicle events that will be discussed in detail below. The pre-set variables and/or predetermined vehicle events may be selected and then the appropriate vehicle ride height 58 empirically established for each variable and/or event during testing and development of the vehicle 10 for subsequent programming into the controller 62. The controller 62 may also be configured as a vehicle body controller or an integrated vehicle central processing unit (CPU) capable of, among other functions, regulating operation of the powertrain 14.

The controller 62 is configured to select the ride height 58 at each suspension corner 36 in response to the detected occurrence of the at least one predetermined vehicle event by regulating the volume of fluid being held by the bladder. One of such predetermined vehicle events may be an initiation of operation of the electrical system 60, such as by the vehicle 10 being unlocked or otherwise switched on by an operator. As shown in FIG. 1, the vehicle 10 may also include a user-interface-based manual switch 63 positioned inside the passenger compartment 12A. As shown, the manual switch 63 is in operative communication with the controller 62. The manual switch 63 is configured to request a specific ride height 58 by generating a signal when actuated by an operator of the vehicle 10. The manual switch 63 may be configured, i.e., designed and constructed, to select more than one specific ride height either via multiple available switch positions or via other means known to those skilled in the art. In turn, the controller 62 is configured to receive the signal thus generated by the manual switch 63 and in response select the appropriate ride height 58.

The controller 62 is also configured to detect a road speed of the vehicle 10 based on a signal generated by a sensor (not shown) that may be located in the transmission 18 or at the front wheels 20 and/or rear wheels 22. The controller 62 may additionally be configured to select the ride height 58 automatically in response to the detected road speed of the vehicle 10. For example, the controller 62 can be programmed to enhance aerodynamics, i.e., wind resistance, of the vehicle 10 in order to reduce fuel consumption of the engine 16 via reducing the ride height 58 above a predetermined speed 13A. In such a case, the controller 62 is programmed to compare the detected road speed of the vehicle 10 with the predetermined speed 13A and reduce the ride height via the bladders 40 when the detected road speed exceeds the predetermined speed programmed into the controller.

The previously discussed accumulator 54 may be configured to selectively accumulate the fluid pumped by the bladder 40 and release the fluid to the bladder above an accumulator pressure threshold value 54A. The accumulator pressure threshold value 54A is then programmed into the controller 62 as one of the above-mentioned predetermined vehicle events. Accordingly, the controller 62 may also be configured to detect an occurrence of the accumulator pressure threshold value 54A. Another predetermined vehicle event may be an operating mode 18A of the transmission 18, such as either a park position, or any of the forward or reverse drive ranges selected in response to a request generated by an operator of the vehicle 10. Accordingly, the controller 62 may be configured to detect occurrence of the operating mode of the transmission 18 in order to select the ride height 58 of the vehicle 10 at the suspension corner 36 via the respective bladder 40.

As shown in FIGS. 2-3, the previously discussed damper 30 may be arranged between the lower control arm 28 and the vehicle body 12. Accordingly, the forces generated at the wheels 20, 22 displace the lower control arm 28 and in turn actuate and cycle the bladder 40 such that the volume of the fluid 44 contained within the bladder is pumped out. As shown in FIG. 2, the accumulator 54 may be mounted to the damper 30 or to the vehicle body 12 (as shown in FIG. 3). In the case where the suspension corner 36 employs the strut 34, the accumulator 54 may be similarly mounted to the strut (as shown in FIG. 3) or to the vehicle body 12 (as shown in FIG. 5). As shown in FIG. 6, the bladder 40 has a general ring shape 40A defining a hollow middle section 40B. The damper 30 includes a fastening member 64 that extends through the middle section 40B and uses a complementary threaded nut 66 for retention of the damper to the vehicle 10.

As shown in FIGS. 4-5, in the case that the bladder 40 is arranged between the strut 34 and the vehicle body 12, the fastening member 64 is secured via the threaded nut 66 to the vehicle body 12, such as at the shock tower 68. Although in FIGS. 4-5 the bladder 40 is arranged between the strut 34 and the body 12, as in the embodiment of FIGS. 2-3, the bladder may also be arranged between the damper 30 and the lower control arm 28. As shown, the fastening member 64 extends through the lower control arm 28 and is then secured to the control arm via the threaded nut 66. The suspension system 24 may also include more than one bladder 40 at each corner 36. Each corner 36 may include one bladder 40 arranged between either the damper 30 or the strut 34 and the vehicle body 12, and also include the second bladder 40 arranged between the damper or strut and the lower control arm 28. Such twin-bladder configuration permits greater range in the variation of the ride height 58 for the vehicle 10. As shown in FIGS. 4-5, the vehicle body 12 includes a first pocket 70 arranged to accept the first bladder 40 and, as shown in FIGS. 2-3 the control arm includes a second pocket 72 arranged to accept the second bladder 40.

The controller 62 may be programmed to selectively regulate delivery of the fluid 44 into the first and/or second bladders 40 depending on the desired ride height 58 based on the road conditions, the detected road speed of the vehicle 10, and the general performance expected from the vehicle by its operator. Accordingly, the suspension system 24 provides a cost effective approach to regulating vehicle ride height 58 by capturing kinetic energy generated by the suspension's articulated movement. Additionally, the suspension system 24 may facilitate reduction of fuel consumption of the vehicle 10 as a result of the reduced ride height that favorably impacts the vehicle's coefficient of air drag. Furthermore, the suspension system 24 achieves regulation of the vehicle ride height 58 without resorting to the complexity of a full pneumatic suspension that generally eschews standard springs and dampers.

Figure 8:
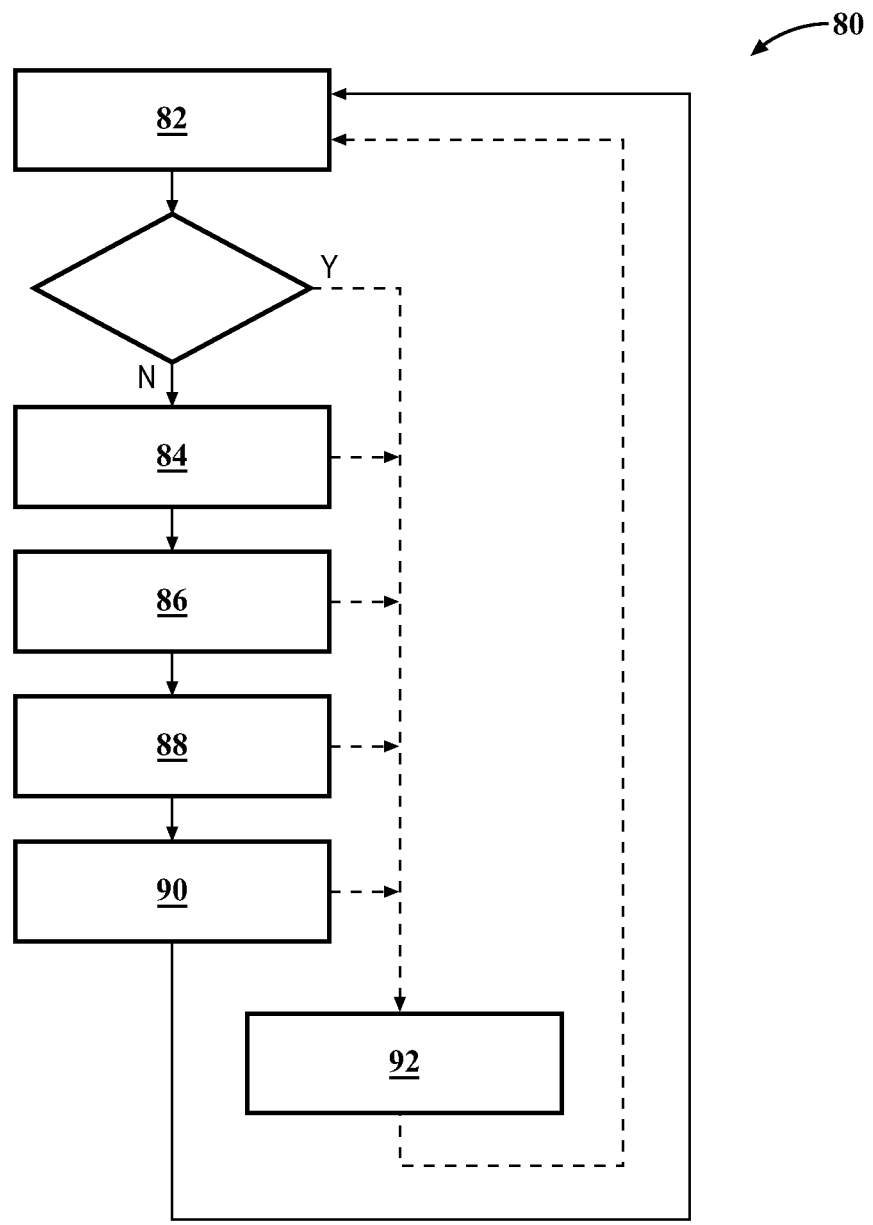
FIG. 8 is a flow diagram of a method for controlling ride height at the suspension corner of the adjustable suspension system depicted in FIGS. 1-7.

FIG. 8 depicts a method 80 of controlling ride height 58 at the suspension corner 36 of the adjustable suspension system 24, described above with respect to FIGS. 1-7. The method 80 commences in frame 82 with the controller 62 monitoring operation of the vehicle 10. The method 80 then proceeds from frame 82 to frame 84 where the method includes detecting via the controller 62 an occurrence of a predetermined vehicle event, such as the initiation of operation of the electrical system 60, the ride height 58 requested by the operator via the manual switch 63, the accumulator threshold pressure value 54A, and the operating mode of the transmission 18, as described above with respect to FIGS. 1-7. Following frame 84, the method 80 advances to frame 86.

In frame 86 the method 80 includes detecting via the controller 62 the road speed of the vehicle 10. After frame 86, the method 80 proceeds to frame 88. In frame 88, the method includes monitoring the ride height 58 in real-time via the signal received from each sensor 61 that is indicative of the volume of the fluid 44 held by the respective bladder 40 operating in the fluid retention mode 40-2. Following frame 88, the method 80 advances to frame 90, where the method includes selecting the ride height 58 in response to the detected occurrence of the at least one predetermined vehicle event and the detected road speed of the vehicle 12 by regulating the volume of the fluid being held by each bladder 40.

As discussed above with respect to FIGS. 1-7, selecting the ride height 58 in response to the detected road speed of the vehicle may be accomplished automatically via the controller 62. In the case that the ride height 58 was selected manually via the switch 63, for example the lowered ride height corresponding to the deflated height 42B, the controller 62 may maintain such a manually selected ride height as an override to any automatic selection of the ride height 58 based on the detected vehicle events. Such an override in response to the manual selection of the ride height 58 via the switch 63 may take place in frame 92 following any of the frames 82-90 of the method 80. Following either frame 90 or 92 the method may return to frame 82 for continuous monitoring of operation of the vehicle 10.

In the even that the threshold pressure value 54A has not been achieved in the accumulator 54 and/or detected by the controller 62, the controller will continue monitoring pressure inside the accumulator until the pressure reaches the threshold value before increasing the ride height 58. In the event that the detected vehicle road speed is below a predetermined speed 13A above which aerodynamics of the vehicle 10 can be enhanced by reducing the ride height 58, the controller 62 can command the adjustable suspension system 24 to reduce the ride height via the bladders 40. Otherwise, if the detected road speed of the vehicle 10 is below such a predetermined speed 13A, the controller 62 can command the adjustable suspension system 24 to maintain currently selected ride height 58.

If the vehicle ride height 58 was reduced for enhanced aerodynamics, once the detected road speed of the vehicle 10 drops below the predetermined speed 13A, the ride height may again be increased. In the event that the selected operating mode 18A of the transmission 18 is the park mode, the controller 62 may reduce the ride height 58 for ease of occupant ingress/egress into/from the vehicle 10. Otherwise, the controller 62 can maintain the currently selected ride height. In the event that operation of the electrical system 60 was initiated, the controller 62 can also reduce the ride height 58 via the bladders 40 for ease of occupant ingress/egress and then increase the ride height once either the discussed drive or reverse range for the transmission 18 has been selected. However, as discussed above, the controller 62 can be programmed to override automatic selection of the ride height 58 in response to occurrence of pre-programmed road speed and vehicle events when the ride height was selected manually via the switch 63, and maintain such manually selected ride height.

As the method 80 proceeds and the vehicle 10 traverses the road surface 13, each bladder 40 may operate in the pump mode 40-1. Accordingly, each bladder 40 may continue pumping the fluid 44 to fill the accumulator 54 in order to maintain the accumulator pressure above the threshold value 54A and up to a maximum permitted pressure value 54B. The maximum permitted pressure value 54B for the accumulator 54 may be determined based on structural limitations of the accumulator and the fluid tubes 50. Thus filled, the accumulator 54 will retain the fluid 44 for subsequent release to the respective bladders 40 when the controller 62 commands the vehicle ride height 58 to be increased, and the bladders will then proceed to operate in fluid retention mode 40-2, as described above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling a suspension corner of an adjustable suspension system in a vehicle having a vehicle body and a road wheel, wherein the suspension corner connects the road wheel to the vehicle body and maintains contact between the road wheel and a road surface, the method comprising:
   monitoring operation of the vehicle;
   detecting an occurrence of at least one predetermined vehicle event;
   detecting a road speed of the vehicle;
   monitoring a height of the vehicle body relative to the road surface at the suspension corner, wherein the height of the vehicle body relative to the road surface at the suspension corner is selectable via a bladder arranged at the suspension corner, characterized by a variable height, and configured to pump a fluid in response to forces generated at the road wheel and hold at least a volume of the fluid; and
   selecting the height of the vehicle body relative to the road surface at the suspension corner in response to the detected occurrence of the at least one predetermined vehicle event and the detected road speed of the vehicle by regulating the volume of the fluid being held by the bladder.

2. The method according to claim 1, wherein the vehicle includes an electrical system having a controller, wherein the electrical system is in operative communication with the adjustable suspension system, and wherein each of said monitoring operation of the vehicle, detecting the occurrence of the at least one predetermined vehicle event, detecting the road speed of the vehicle, monitoring the height of the vehicle body, and selecting the height of the vehicle body is accomplished via the controller.

3. The method according to claim 2, wherein said detecting the occurrence of the at least one predetermined vehicle event includes detecting initiation of operation of the electrical system.

4. The method according to claim 2, wherein the vehicle includes a user-interface-based manual switch in operative communication with the controller and configured to request the height of the vehicle body relative to the road surface at the suspension corner, and wherein said detecting the occurrence of the at least one predetermined vehicle event includes detecting via the controller the height of the vehicle body relative to the road surface at the suspension corner requested via the user-interface-based manual switch.

5. The method according to claim 2, wherein said selecting the height of the vehicle body relative to the road surface at the suspension corner in response to the detected road speed of the vehicle is accomplished automatically via the controller.

6. The method according to claim 2, wherein the adjustable suspension system includes an accumulator configured to selectively retain the fluid pumped by the bladder and release the fluid to the bladder above an accumulator pressure threshold value, wherein the accumulator pressure threshold value is programmed into the controller, and wherein said detecting the occurrence of the at least one predetermined vehicle event includes detecting the accumulator threshold pressure value via the controller.

7. The method according to claim 2, wherein the vehicle includes a powertrain having a transmission, and wherein said detecting the occurrence of the at least one predetermined vehicle event includes detecting via the controller an operating mode of the transmission.

8. The method according to claim 6, wherein the adjustable suspension system includes:
   a valve in fluid communication with the accumulator and configured to selectively retain the accumulated fluid in and release the accumulated fluid from the accumulator; and
   a sensor configured to detect the volume of the fluid held by the bladder and generate a signal indicative of the volume to the controller; and
   wherein said selecting the height of the vehicle body is accomplished via the controller regulating the valve in response to the signal.

9. The method according to claim 1, wherein the suspension corner includes a control arm connecting the road wheel to the vehicle body and a damper arranged between the control arm and the vehicle body and configured to cushion the forces being generated at the road wheel as the vehicle traverses the road surface, and wherein the forces generated at the road wheel displace the control arm and in turn actuate the bladder to pump the fluid.

10. The method according to claim 9, wherein the bladder has a general ring shape defining a hollow middle section, and wherein the damper includes a fastening member that extends through the middle section.

11. The method according to claim 9, wherein the bladder includes a first bladder and a second bladder, and wherein the first bladder is arranged between the damper and the vehicle body and the second bladder is arranged between the damper and the control arm.

12. A vehicle comprising:
   a vehicle body;
   a road wheel configured to maintain contact with a road surface;
   an adjustable suspension system having a vehicle suspension corner connecting the road wheel to the vehicle body and configured to maintain contact between the road wheel and the road surface; and
   an electrical system having a controller, wherein the electrical system is in operative communication with the adjustable suspension system, and wherein the controller is configured to:
   monitor operation of the vehicle;
   detect an occurrence of at least one predetermined vehicle event;
   detect a road speed of the vehicle;
   monitor a height of the vehicle body relative to the road surface at the suspension corner, wherein the height of the vehicle body relative to the road surface at the suspension corner is selected via a bladder arranged at the suspension corner, characterized by a variable height, and configured to pump a fluid in response to forces generated at the road wheel and hold at least a volume of the fluid; and
   select the height of the vehicle body relative to the road surface at the suspension corner in response to the detected occurrence of the at least one predetermined vehicle event and the detected road speed of the vehicle by regulating the volume of fluid being held by the bladder.

13. The vehicle according to claim 12, wherein the occurrence of the at least one predetermined vehicle event includes initiation of operation of the electrical system.

14. The vehicle according to claim 12, further comprising a user-interface-based manual switch in operative communication with the controller and configured to request the height of the vehicle body relative to the road surface at the suspension corner, and wherein the controller is configured to detect the occurrence of the at least one predetermined vehicle event by detecting the height of the vehicle body relative to the road surface at the suspension corner requested via the user-interface-based manual switch.

15. The vehicle according to claim 12, wherein the controller is configured to select the height of the vehicle body relative to the road surface at the suspension corner automatically in response to the detected road speed of the vehicle.

16. The vehicle according to claim 12, wherein the adjustable suspension system includes an accumulator configured to selectively accumulate the fluid pumped by the bladder and release the fluid to the bladder above an accumulator pressure threshold value, wherein the accumulator pressure threshold value is programmed into the controller, and wherein the controller is configured to detect the occurrence of the at least one predetermined vehicle event by detecting an occurrence of the accumulator pressure threshold value.

17. The vehicle according to claim 12, further comprising a powertrain having a transmission, wherein the controller is configured to detect the occurrence of the at least one predetermined vehicle event by detecting an operating mode.

18. The vehicle according to claim 16, wherein the adjustable suspension system includes:
   a valve in fluid communication with the accumulator and configured to selectively retain the accumulated fluid in and release the accumulated fluid from the accumulator; and
   a sensor configured to detect the volume of the fluid held by the bladder and generate a signal indicative of the volume to the controller; and
   wherein the controller is configured to regulate the valve in response to the signal and thereby select the height of the vehicle body.

19. The vehicle according to claim 12, wherein the suspension corner includes a control arm connecting the road wheel to the vehicle body and a damper arranged between the control arm and the vehicle body and configured to cushion the forces being generated at the road wheel as the vehicle traverses the road surface, and wherein the forces generated at the road wheel displace the control arm and in turn actuate the bladder to pump the fluid.

20. The vehicle according to claim 19, wherein the bladder has a general ring shape defining a hollow middle section, and wherein the damper includes a fastening member that extends through the middle section.

\* \* \* \* \*